US009253638B2

(12) United States Patent
Xia et al.

(10) Patent No.: US 9,253,638 B2
(45) Date of Patent: Feb. 2, 2016

(54) SINGLE CARD MULTI-MODE MULTI-OPERATOR AUTHENTICATION METHOD AND DEVICE

(75) Inventors: Meng Xia, Shenzhen (CN); Jin Liu, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 14/394,783

(22) PCT Filed: Jun. 7, 2012

(86) PCT No.: PCT/CN2012/076597
§ 371 (c)(1),
(2), (4) Date: Oct. 16, 2014

(87) PCT Pub. No.: WO2013/155768
PCT Pub. Date: Oct. 24, 2013

(65) Prior Publication Data
US 2015/0072650 A1    Mar. 12, 2015

(30) Foreign Application Priority Data

Apr. 16, 2012 (CN) .......................... 2012 1 0111362

(51) Int. Cl.
*H04M 1/66* (2006.01)
*H04M 1/68* (2006.01)
*H04M 3/16* (2006.01)
*H04W 12/06* (2009.01)

(52) U.S. Cl.
CPC .................................... *H04W 12/06* (2013.01)

(58) Field of Classification Search
CPC ................................................ H04W 12/06
See application file for complete search history.

(56) References Cited

U.S. PATENT DOCUMENTS

| 8,934,278 B2 * | 1/2015 | Vattikonda | G11C 15/00 365/189.07 |
| 2002/0091666 A1 * | 7/2002 | Rice | G06N 3/004 |
| 2003/0059858 A1 * | 3/2003 | Wiesner | C12N 15/1086 506/2 |

(Continued)

FOREIGN PATENT DOCUMENTS

| CN | 1484459 A | 3/2004 |
| CN | 1980435 A | 6/2007 |
| CN | 101330718 A | 12/2008 |

OTHER PUBLICATIONS

International Search Report for coresponding application PCT/CN2012/076597 filed Jun. 7, 2012; Mail date Jan. 24, 2013.

*Primary Examiner* — Erin File
(74) *Attorney, Agent, or Firm* — Cantor Colburn LLP (57) ABSTRACT

Provided are a single-card multi-mode multi-operator authentication method and device. An MAML in an AP receives an authentication request from a user, and authenticates hybrid networks found by a UE. Under the condition of determining that the authentication on each network in the hybrid networks is passed, the MAML receives terminal position information sent by the UE, and determines whether the terminal position information is the same as operator area information registered by the UE in advance, if so, the MAML acquires signal strength of each network and determines whether the signal strength of each network falls within a signal strength range covered by a base station under the network, if so, determines that all the networks in the hybrid networks are authenticated successfully, otherwise, determines that the authentication fails. The security in using an SIM card by a valid user and secure network service are ensured.

20 Claims, 5 Drawing Sheets

(56) References Cited

U.S. PATENT DOCUMENTS

| | | | | |
|---|---|---|---|---|
| 2003/0181380 A1* | 9/2003 | Pear | ................... | A61K 38/1709 435/6.14 |
| 2004/0180349 A1* | 9/2004 | Kaye | ................... | C12Q 1/6886 435/6.14 |
| 2006/0050680 A1* | 3/2006 | Naim | ................... | H04L 63/062 370/352 |
| 2007/0140220 A1 | 6/2007 | Doradla | | |
| 2012/0090043 A1* | 4/2012 | Twizere | ............... | C07K 14/005 800/14 |
| 2012/0207744 A1* | 8/2012 | Mendlein | ............. | C12N 5/0696 424/130.1 |
| 2014/0120540 A1* | 5/2014 | Seligmann | ........... | C12Q 1/6886 435/6.11 |
| 2015/0072650 A1* | 3/2015 | Xia | ....................... | H04W 12/06 455/411 |
| 2015/0183856 A1* | 7/2015 | Kim | ....................... | C07K 16/22 424/156.1 |

* cited by examiner

SINGLE CARD MULTI-MODE MULTI-OPERATOR AUTHENTICATION METHOD AND DEVICE

TECHNICAL FIELD

The disclosure relates to the field of communications, in particular to a single-card multi-mode multi-operator authentication method and device.

BACKGROUND

As the issuing of 3G (third generation mobile communications) license, the domestic 3G network is being constructed gradually, and three major mobile communication operators all come into the 3G era officially. Meanwhile, it has been presented to the schedule for constructing a long term evolution (referred to as LTE) network under the framework of 4G (fourth generation mobile communications), and some cities have started to construct a test network. The 3G network technology adopts the TD-SCDMA standard, which is a developing technical standard. WIFI network is also afoot in the industry while TD network construction is enhanced so as to promote the LTE process. Furthermore, in the above-mentioned process of implementing 3G and promoting 4G, an enhanced data rate for GSM evolution (referred to as EDGE) network, a TD-SCDMA, a WIFI network and an LTE network all play a key role.

In this case, the problem of how to deal with the relationships among four networks, i.e., EDGE, TD, WIFI, and LTE will arise subsequently. In order to enable the four networks, i.e., EDGE, TD, WIFI, and LTE to form an integrated network with progressive rates, progressive coverage distances and mutual complementation, the plan of integrating the four networks is proposed.

At present, the growing popularity of intelligent terminals and tablet personal computers officially proclaims the arrival of mobile Internet era. The mobile Internet is the development intersection of telecommunications industry and IT industry, and as the cover range of wireless local area network (referred to as WLAN) expands gradually, WIFI cover hotspots are established widely, and the LTE network construction is continuously completed, intelligent mobile phone terminals such as Android system have been accepted by more and more users, leading the trend of 3G terminal era. Under the situation that the four networks, i.e., EDGE, TD, WIFI, and LTE are integrated, the usage security of users starts to appear on the agenda.

Because of the coexistence of multiple mobile networks, the complexity of the network scenario, and the cover range difference of different mobile networks, it is easy to come across the situation that multiple networks coexist or there is only a certain single mobile network in the process of using a 3G terminal. However, so far, there is no secure authentication method capable of achieving an authentication mechanism under the conditions of the coexistence of multiple networks and the coexistence of multiple operators simultaneously regarding this case so as to ensure the security when the user uses a subscriber identity module (referred to as SIM) card, and the acquisition of services by a valid user and the normal operation of the network cannot be guaranteed.

In view of the problem that there is no secure authentication method capable of achieving an authentication mechanism under the conditions of the coexistence of multiple networks and the coexistence of multiple operators simultaneously in the relevant art, no effective solution has been proposed so far.

SUMMARY

The disclosure provides a single-card multi-mode multi-operator authentication method and device so as to solve the above-mentioned problem.

According to one embodiment of the disclosure, a single-card multi-mode multi-operator authentication method is provided, which includes: a multi-mode authentication manager layer (MAML) in an application processor (AP) receiving an authentication request from a user via a framework layer, and authenticating hybrid networks found by a user equipment (UE); under a condition that the MAML determines that the authentication on each network in the hybrid networks is passed, receiving terminal position information sent by the UE, and judging whether the terminal position information is the same as operator area information registered by the UE in advance; and under a condition that the terminal position information is the same as the operator area information, the MAML acquiring signal strength of each of the networks and judging whether the signal strength of each of the networks falls within a signal strength range covered by a base station under the network, if a judgment result is yes, determining that all networks in the hybrid networks are authenticated successfully, and if the judgment result is no, determining that the authentication fails.

In the described embodiment, the MAML in the AP receiving the authentication request from the user via the framework layer, and authenticating the hybrid networks found by the UE includes: the MAML receiving the authentication request sent by the user regarding a default network via the framework layer, and authenticating the default network, wherein the default network is any network in the hybrid networks; and under a condition that the authentication on the default network is passed, authenticating other networks apart from the default network in the hybrid networks.

In the described embodiment, before the MAML receives the authentication request sent by the user regarding the default network via the framework layer, the method further includes: the UE inserted with a subscriber identity module (SIM) card acquiring signal strength of all the networks in the hybrid networks, and registering the network with the strongest signal strength as the default network, wherein the SIM card is burned with various network mode information and multiple operator information.

In the described embodiment, the MAML receiving the authentication request sent by the user regarding the default network via the framework layer, and authenticating the default network includes: the MAML receiving a first authentication request sent by the user regarding the default network via the framework layer, and sending the first authentication request to a first operator platform of the default network via a radio interface layer (RIL) and a communication processor (CP); and receiving, via the RIL and the CP, a first authentication result fed back by the first operator platform, and determining whether the authentication on the default network is passed according to the first authentication result.

In the described embodiment, under the condition that the authentication on the default network is passed, authenticating other networks apart from the default network in the hybrid networks includes: the MAML receiving a second authentication request sent by the user regarding other networks apart from the default network in the hybrid networks via the framework layer, and sending the second authentication request to a second operator platform of the other networks via the RIL and the CP; and receiving, via the RIL and the CP, a second authentication result fed back by the second operator platform, and determining whether the authentication on the other networks is passed according to the second authentication result.

In the described embodiment, under the condition that the MAML determines that the authentication on each network in the hybrid networks is passed, receiving the terminal position information sent by the UE, and judging whether the terminal position information is the same as the operator area information registered by the UE in advance include: determining that the authentication on each network in the hybrid networks is passed; receiving the terminal position information about the UE, which is detected by the UE via a GPS module and indicates a country or an area where the UE is currently located; and judging whether the terminal position information is the same as the operator area information, wherein the operator area information is included in the operator information.

In the described embodiment, under the condition that the terminal position information is the same as the operator area information, the MAML acquiring the signal strength of each of the networks and judging whether the signal strength of each of the networks falls within a signal strength range covered by a base station under the network, if the judgment result is yes, determining that all the networks in the hybrid networks are authenticated successfully, and if the judgment result is no, determining that the authentication fails include: the MAML performing signal detection on each network via a radio frequency signal to acquire the signal strength of each network, and combining the signal strength of all the networks into a vector combination according to the network mode information, and issuing the vector combination to each operator base station via the RIL and the CP; the operator base station parsing out signal strength corresponding to the operator base station from the vector combination, and comparing the signal strength parsed out with a signal strength range covered by the operator base station, if the signal strength parsed out falls within the signal strength range, returning information about correct authentication to the MAML via the RIL and the CP, and otherwise, returning information about incorrect authentication; and when the MAML receives the information about correct authentication, determining that all the networks in the hybrid networks are authenticated successfully, and when the MAML receives the information about incorrect authentication, determining that the authentication fails.

In the described embodiment, after determining that all the networks in the hybrid networks are authenticated successfully, the MAML notifies the user that the hybrid networks are secure via the framework layer, or, after determining that the authentication fails, the MAML notifies the user that the hybrid networks have a security risk via the framework layer.

In the described embodiment, under the condition that the MAML determines that the authentication on one or more networks in the hybrid networks is not passed, it is determined that the authentication on the hybrid networks fails.

In the described embodiment, under the condition that the terminal position information is not the same as the operator area information, it is determined that the authentication on the hybrid networks fails.

In the described embodiment, the hybrid networks include at least two of the following: an enhanced data rate for GSM evolution (EDGE) network, a time-division multiplexing (TD) network, a wireless fidelity (WIFI) network, and a long term evolution (LTE) network.

According to another embodiment of the disclosure, a single-card multi-mode multi-operator authentication device is provided. The device includes: an authentication component, configured to receive an authentication request from a user via a framework layer, and authenticate hybrid networks found by a user equipment (UE); a first decision component, configured to, under a condition of determining that the authentication on each network in the hybrid networks is passed, receive terminal position information sent by the UE, and judge whether the terminal position information is the same as operator area information registered by the UE in advance; and a second decision component, configured to, under a condition that the terminal position information is the same as the operator area information, acquire signal strength of each of the networks and judge whether the signal strength of each of the networks falls within a signal strength range covered by a base station under the network, if a judgment result is yes, determine that all networks in the hybrid networks are authenticated successfully, and if the judgment result is no, determine that the authentication fails.

In the described embodiment, the authentication component includes: a first authentication unit, configured to receive an authentication request sent by a user regarding a default network via the framework layer, and authenticate the default network, wherein the default network is any network in the hybrid networks; and a second authentication unit, configured to, under a condition that the authentication on the default network is passed, authenticate other networks apart from the default network in the hybrid networks.

In the described embodiment, the authentication component further includes: a registration unit, configured to, according to a subscriber identity module (SIM) card, acquire signal strength of all the networks in the hybrid networks, and register the network with the strongest signal strength as the default network, wherein the SIM card is burned with various network mode information and multiple operator information.

In the described embodiment, the first decision component includes: a first determination unit, configured to determine that the authentication on each network in the hybrid networks is passed; a receiving unit, configured to receive the terminal position information about the UE, which is detected by the UE via a GPS component and indicates a country or an area where the UE is currently located; and a judgment unit, configured to judge whether the terminal position information is the same as the operator area information, wherein the operator area information is included in the operator information.

In the described embodiment, the second decision component includes: a detection unit, configured to perform signal detection on each network via a radio frequency signal to acquire the signal strength of each network, and combine the signal strength of all the networks into a vector combination according to the network mode information, and issue the vector combination via a radio interface layer (RIL) and a communication processor (CP); a comparison unit, configured to receive the vector combination and parse out signal strength corresponding to the operator base station from the vector combination, and compare the signal strength parsed out with a signal strength range covered by the operator base station, if the signal strength parsed out falls within the signal strength range, return information about correct authentication to a second determination unit via the RIL and the CP, and otherwise, return information about incorrect authentication; and the second determination unit, configured to, when receiving the information about correct authentication, determine that all the networks in the hybrid networks are authenticated successfully, or, when receiving the information about incorrect authentication, determine that the authentication fails.

In the described embodiment, the hybrid networks include at least two of the following: an enhanced data rate for GSM evolution (EDGE) network, a time-division multiplexing (TD) network, a wireless fidelity (WIFI) network, and a long term evolution (LTE) network.

In accordance with the disclosure, by means of performing multi-level authentication and relevant information judgment with regard to each network in hybrid networks so as to finally determine whether the authentication on all the hybrid networks is successful, the problem in the relevant art of being unable to authenticate hybrid networks under the conditions of the coexistence of multiple networks and the coexistence of multiple operators is solved, thereby achieving the effect of ensuring the security when a valid user uses a SIM card so that the valid user can acquire secure network services, and ensuring well network operation for an operator.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the drawings.

DETAILED DESCRIPTION OF THE EMBODIMENTS

The disclosure is described below with reference to the accompanying drawings and embodiments in detail. Note that, the embodiments of the present application and the features of the embodiments can be combined with each other if there is no conflict.

It can be seen from the related art that the current solution achieves the authentication mechanism of a 2G (GSM) network and a 3G (WCDMA) network. The 2G (GSM) network mainly performs network authentication by using the method of authenticating a client via an authentication centre in an access network aspect. In this method, the way of keeping communication information secret is used in a wireless path. This type of identification is single-direction authentication, i.e., there is merely the identification on a user by a network but no identification on the network by the user. As the arrival of 3G era, the WCDMA adopts the authentication way of five information element sets, and the length of the secret key of the WCDMA is lengthened from 64 bits in the 2G network to 128 bits. The encryption algorithm and secret key in the 3G network are determined via negotiation between the user and the network by using a secure guarding mechanism. In short, the security of the 3G network is established on the basis that the network is credible enough. However, the authentication mechanism regarding the situation of four-network integration has not been proposed and achieved yet, and the solution in the embodiments of the disclosure can implement the authentication mechanism under four-network integration.

In order to achieve the authentication mechanism under the situation of four network integration, the embodiments of the disclosure provide the solution of a single-card multi-mode multi-operator authentication method and device. For better understanding the thinking of the solution to solve its technical problem, the technical solution is now introduced briefly. A multi-mode authentication manager layer (referred to as MAML) is constructed between a radio interface layer (referred to as RIL) and a framework layer in an application processor (referred to as AP). After a terminal is started, user equipment (referred to as UE) of a subscriber identity module (referred to as SIM) card is used to firstly send registration information to different network operators (certainly, this SIM card may pre-burn authentication information about multiple operators). Then, the AP automatically initiates different authentication messages (carrying authentication request messages) to an MAML. After receiving different authentication messages, the MAML initiates authentication requests to different networks firstly. After different network operators verify that it is correct, a data packet (including an authentication result) is returned to an RIL layer. Finally, the MAML is used to judge the authentication results returned by different network operators respectively, and meanwhile a GPS component is started to detect the position of a country and an area where a UE is currently located so as to ensure that the area position detected by the GPS is consistent with the area of the registered network. Meanwhile, the MAML starts a real-time radio frequency detection circuit to detect signal strength of each network of the current hybrid networks with 2G/3G/4G/Wifi, and then these pieces of signal strength information combined with the working mode of each network are combined into a two-dimensional authentication vector combination, and then the two-dimensional authentication vector combination is sent to a network layer via the MAML for the final authentication and identification. For example, a sending operation can be performed by means of a first input first output (referred to as FIFO) way. In an embodiment of the disclosure, in the entire authentication process, whenever the authentication on one network is not passed, a network side will return error information to the MAML, and the MAML parses out which kind of network mode has an error and finally notifies a terminal user so as to guarantee full and reliable transmission of user information, achieving secret communication.

Figure 1:
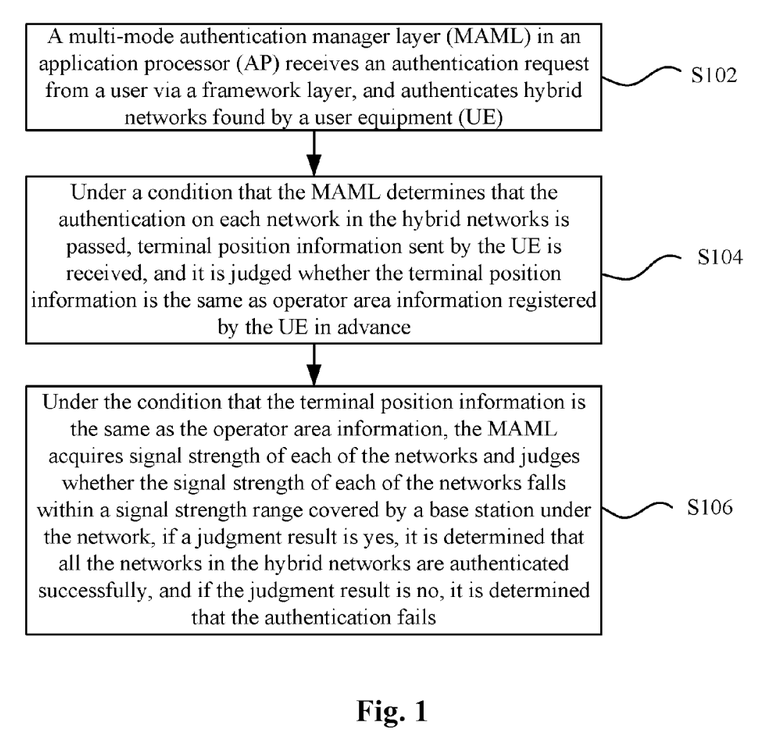
FIG. 1 is a flowchart of a single-card multi-mode multi-operator authentication method according to an embodiment of the disclosure.

FIG. 1 is a flowchart of a single-card multi-mode multi-operator authentication method according to an embodiment of the disclosure. As shown in FIG. 1, the method mainly includes the following steps (step S102-step S106).

Step S102, a multi-mode authentication manager layer (MAML) in an application processor (AP) receives an authentication request from a user via a framework layer, and authenticates hybrid networks found by a user equipment (UE).

Step S104, under a condition that the MAML determines that the authentication on each network in the hybrid networks is passed, terminal position information sent by the UE is received, and it is judged whether the terminal position information is the same as operator area information registered by the UE in advance.

Step S106, under the condition that the terminal position information is the same as the operator area information, the MAML acquires signal strength of each of the networks and judges whether the signal strength of each of the networks falls within a signal strength range covered by a base station under the network, if a judgment result is yes, it is determined that all the networks in the hybrid networks are authenticated successfully, and if the judgment result is no, it is determined that the authentication fails.

In step S102 of the present embodiment, the MAML may receive the authentication request sent by the user regarding a default network via the framework layer, and authenticate the default network, wherein the default network is any network in the hybrid networks. In practical applications, the hybrid networks may include 2G (second generation), 3G (third generation) and 4G (fourth generation) networks. For example, in an example embodiment of the disclosure, the hybrid networks may be composed of at least two networks of an enhanced data rate for GSM evolution (referred to as EDGE) network, a time-division (referred to as TD) multiplexing network, a wireless fidelity (WIFI) network, and a long term evolution (referred to as LTE) network. Under the condition that the authentication on the default network is passed, other networks apart from the default network in the hybrid networks may be authenticated.

In the present embodiment, before the MAML receives the authentication request sent by the user regarding the default network via the framework layer, there may be a registration operation of the default network. In the process that the UE registers the default network, the UE inserted with a subscriber identity module (SIM) card firstly confirms signal strength of all the networks in the current hybrid networks according to network signal strength of multiple operators found after the start-up, and registers the network with the strongest signal strength as the default network after comparing the signal strength of all the networks. It should be noted that the SIM card may be pre-burned with various network mode information and multiple operator information, and these pieces of network mode information and operator information may serve as a part of the important basis of performing subsequent operations.

After the MAML receives an authentication request sent by the user regarding the default network via the framework layer, the following ways may be used to authenticate the default network. When the MAML receives a first authentication request (the request is only initiated regarding the default network) sent by the user regarding the default network via the framework layer, the first authentication request can be sent to a first operator platform of the default network via a radio interface layer (referred to as RIL) and a communication processor (referred to as CP); and once the first operator platform completes the authentication operation, a first authentication result fed back by the first operator platform is received via the RIL and the CP, and it is determined whether the authentication on the default network is passed according to the first authentication result.

In the present embodiment, under the condition that the authentication on the default network is passed, other networks apart from the default network in the hybrid networks may be authenticated, which may specifically be performed by using the following ways: when the MAML receives a second authentication request sent by the user regarding other networks apart from the default network in the hybrid networks via the framework layer, the second authentication request is sent to a second operator platform (the second operator platform is merely an alternative name, and in practical applications, the number of the hybrid networks can be two, three and also four, and the authentication operation is performed on each of the networks one by one regardless of the number of the networks so as to ensure whether the authentication on each network can be passed) of the other networks via the RIL and the CP; then a second authentication result (the number of the second authentication results corresponds to the number of the networks in the hybrid networks, and each network in the hybrid networks corresponds to an authentication result) fed back by the second operator platform is received via the RIL and the CP; and finally it is determined whether the authentication on the other networks (i.e. all the networks apart from the default network in the hybrid network) is passed according to the second authentication result. The solution may guarantee that the operation of multi-level authentication is performed on each network in the hybrid networks so as to ensure that subsequent steps can be carried on under the condition that the authentication on all the networks is passed.

In step S104 of the present embodiment, in the process of the MAML receiving terminal position information sent by the UE, and judging whether the terminal position information is the same as operator area information registered by the UE in advance, the MAML firstly determines that the authentication on each network in the hybrid networks is passed; under the condition of determining that the authentication on each network in the hybrid networks is passed, the MAML may notify the UE to initiate a GPS component to perform GPS detection; the GPS detects the current position of the UE and acquires the terminal position information about a terminal (the terminal position information can indicate the position of a country or an area where the UE is currently located), and sends the terminal position information to the MAML; and after receiving the terminal position information, the MAML then can judge whether the terminal position information is the same as the operator area information (a part of the operator information).

Under the condition that the terminal position information is the same as the operator area information, the MAML acquires signal strength of each of the networks and judges whether the signal strength of each of the networks falls within a signal strength range covered by a base station under the network, if a judgment result is yes, it is determined that all the networks in the hybrid networks are authenticated successfully, and if the judgment result is no, it is determined that the authentication fails.

In step S106 of the present embodiment, the MAML may firstly perform signal detection on each network via a radio frequency signal to acquire the signal strength of each network, and combine the signal strength of all the networks into a vector combination according to the network mode information, and issue the vector combination to each operator base station via the RIL and the CP; the operator base station parses out signal strength corresponding thereto from the vector combination, and compares the signal strength parsed out with a signal strength range covered by the operator base station, if the signal strength parsed out falls within the signal strength range, information about correct authentication is returned to the MAML via the RIL and the CP, and otherwise, information about incorrect authentication is returned; and when the MAML receives the information about correct authentication, it is determined that all the networks in the hybrid networks are authenticated successfully, and when the MAML receives the information about incorrect authentication, it is determined that the authentication fails.

In an example embodiment, after step S106 and after determining that all the networks in the hybrid networks are authenticated successfully, the MAML may also notify the user that the hybrid networks are secure via the framework layer, or, after determining that the authentication fails, the MAML may notify the user that the hybrid networks have a security risk via the framework layer.

In an example embodiment of the present embodiment, under the condition that the MAML determines that the authentication on one or more networks in the hybrid networks is not passed, it may be determined that the authentication on the hybrid networks fails.

In an example embodiment of the present embodiment, under the condition that the terminal position information is not the same as the operator area information, it may also be determined that the authentication on the hybrid networks fails.

In practical applications, if the user knows that the authentication on all the hybrid networks is passed, the UE can access any network in the hybrid networks safely so as to acquire network services of the operator.

Figure 2:
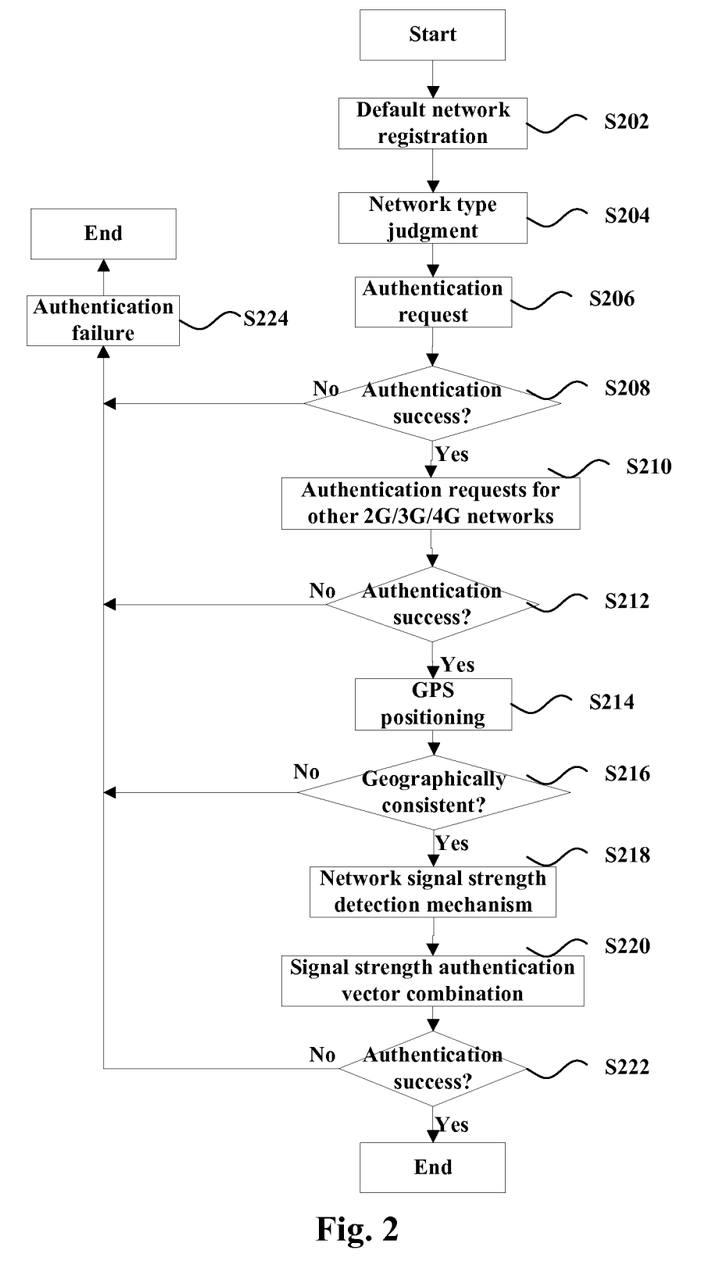
FIG. 2 is a flowchart of a single-card multi-mode multi-operator authentication according to an example embodiment of the disclosure.

The above-mentioned single-card multi-mode multi-operator authentication method is described in detail below in combination with the example embodiment as shown in FIG. 2.

The example embodiment, taking a SIM card burned with authentication information such as 2G/3G/4G as an example, hybrid networks composed of four networks, e.g., 2G (GSM)/3G/4G (LTE)/Wifi are authenticated and identified. The implementation of the scheme of the disclosure is further described in detail.

FIG. 2 is a flowchart of a single-card multi-mode multi-operator authentication according to an example embodiment of the disclosure. As shown in FIG. 2, the flow mainly includes the following steps (step S202-step S224).

Step S202, after a terminal inserted with the SIM card is started, a default network is firstly registered according to signal strength of the current networks. For example, the default network may be decided based on the registered network after the SIM card finds a network after the start-up.

Step S204, the judgment of a network type is performed and it is assumed in this embodiment that the terminal determines that the default network is registered to a GSM network. The registration information and an authentication request can be issued to an MAML manager layer via a Framework layer.

Step S206, the MAML manager layer initiates the authentication request via a CP according to the original authentication solution of the GSM network and waits for an operator to return an authentication result.

Step S208, if the authentication is passed, step S210 is performed, and the authentication result is reported to an application user interface via the MAML manager layer; and if the authentication fails, the subsequent authentication flows are immediately stopped, step S224 is executed, and a message of an authentication failure is returned to an upper application so as to notify a user that there is a security risk.

Step S210, other wireless networks, e.g., 3G, LTE and WIFI are authenticated, the specific flow is still implemented according to the authentication solution of each network, and the MAML manager layer initiates the authentication request.

Step S212, if the authentication is passed, step S214 is performed, and if the authentication on any one of the networks fails, other authentication flows are ended, step S224 is executed, and a message of the failure is returned to the upper application so as to notify the user that there is a security risk.

Step S214, a GPS component of the terminal is started to detect the area position of the terminal and position the geographical position and country area of the terminal; the operator area burned on the SIM card is read and is compared with the geographical position obtained by GPS positioning; if they are consistent, step S216 is executed; and if they are not consistent, step S224 is executed, and a message of the failure is returned to the upper application so as to notify the user that there is a security risk.

Step S216, after determining the above-mentioned three steps of authentication are performed successfully, a network detection mechanism of the MAML manager layer is started to detect the signal strength of four kinds of hybrid networks via a radio frequency signal.

Step S218, after the network signal strength detection, a signal strength value detected by the radio frequency signal is read via the Framework layer and is issued to the MAML manager layer; a two-dimensional authentication vector combination is formed by taking, e.g., 2G, 3G, 4G and Wifi as the horizontal ordinate of the authentication vector combination and the signal strength detected under each network as the vertical ordinate; and the CP sends a data packet including the authentication vector combination to each operator base station via a network.

Step S220, each operator base station firstly parses out the signal strength value of the vertical ordinate corresponding to the two-dimensional vector and compares same with a signal strength range of the corresponding coverage area of the base station under the corresponding network.

Step S222, if the signal strength parsed out value falls within the signal strength range covered by the base station, a notification message of correct authentication is returned and the current flow is ended; and if it exceeds or is less than the signal strength range, step S224 is executed.

Step S224, it is determined that the authentication fails, and a notification message of an authentication failure is returned.

In this method, no matter whether there is one or more networks of GSM, 3G, WIFI and LTE networks in a network environment, the terminal makes the most of all the available networks in the current position via the MAML management component, and continuously starts the current detection mechanism to compare and process by means of detecting signal strength as an authentication vector. Furthermore, the MAML manager layer can obtain the data packet (carrying the notification message of correct authentication or the notification message of an authentication failure) returned through the authentication via the CP and notifies a user application layer via the Framework layer so as to notify the user whether the current hybrid networks have a security risk.

By means of the single-card multi-mode multi-operator authentication method provided by the above-mentioned embodiment, multi-level authentication and relevant information judgment with regard to each network in hybrid networks can be performed so as to finally determine whether the authentication on all the hybrid networks is successful. Whenever the authentication on one network is not passed, a network side will return error information to an MAML, and the MAML parses out which kind of network mode has an error and finally notifies a terminal user, thereby achieving the effect of ensuring the security when a valid user uses a SIM card so that the valid user can acquire secure network services, and ensuring well network operation for an operator.

Figure 3:
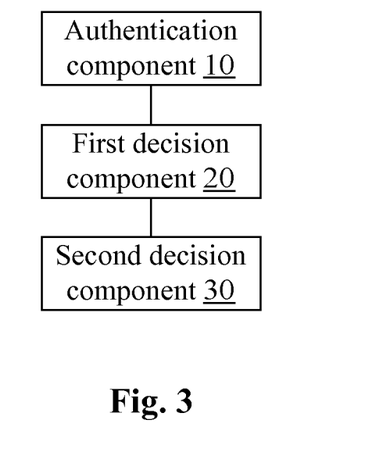
FIG. 3 is a structure diagram of a single-card multi-mode multi-operator authentication device according to an embodiment of the disclosure.

FIG. 3 is a structure diagram of a single-card multi-mode multi-operator authentication device according to an embodiment of the disclosure. The device is used to achieve the single-card multi-mode multi-operator authentication method provided by the above-mentioned embodiment. As shown in FIG. 3, the device mainly includes: an authentication component 10, a first decision component 20 and a second decision component 30. The authentication component 10 is configured to receive an authentication request from a user via a framework layer, and authenticate hybrid networks found by a user equipment (UE); the first decision component 20 is connected to the authentication component 10 and is configured to, under the condition of determining that the authentication on each network in the hybrid networks is passed, receive terminal position information sent by the UE, and judge whether the terminal position information is the same as operator area information registered by the UE in advance; and the second decision component 30 is connected to the first decision component 20 and is configured to, under the condition that the terminal position information is the same as the operator area information, acquire signal strength of each of the networks and judge whether the signal strength of each of the networks falls within a signal strength range covered by a base station under the network, if a judgment result is yes, determine that all the networks in the hybrid networks are authenticated successfully, and if the judgment result is no, determine that the authentication fails.

Figure 4:
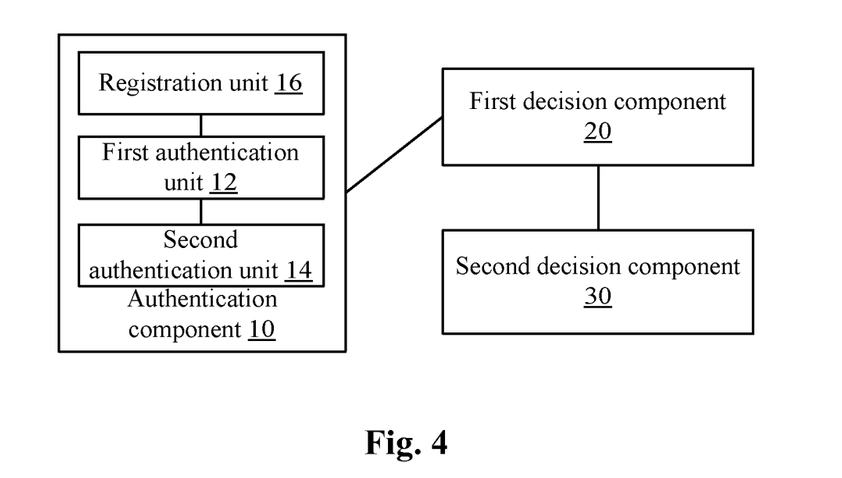
FIG. 4 is a structure diagram of a single-card multi-mode multi-operator authentication device according to one example embodiment of the disclosure.

FIG. 4 is a structure diagram of a single-card multi-mode multi-operator authentication device according to one example embodiment of the disclosure. As shown in FIG. 4, the authentication component 10 in the device can include: a first authentication unit 12, configured to receive an authentication request sent by a user regarding a default network via the framework layer, and authenticate the default network, wherein the default network is any network in the hybrid networks; and a second authentication unit 14, connected to the first authentication unit 12 and configured to, under the condition that the authentication on the default network is passed, authenticate other networks apart from the default network in the hybrid networks.

In an example embodiment, in practical applications, the authentication component can further include: a registration unit 16, connected to the first authentication unit 12 and configured to, according to a subscriber identity module (SIM) card, acquire signal strength of all the networks in the hybrid networks, and register the network with the strongest signal strength as the default network, wherein the SIM card is burned with various network mode information and multiple operator information.

Figure 5:
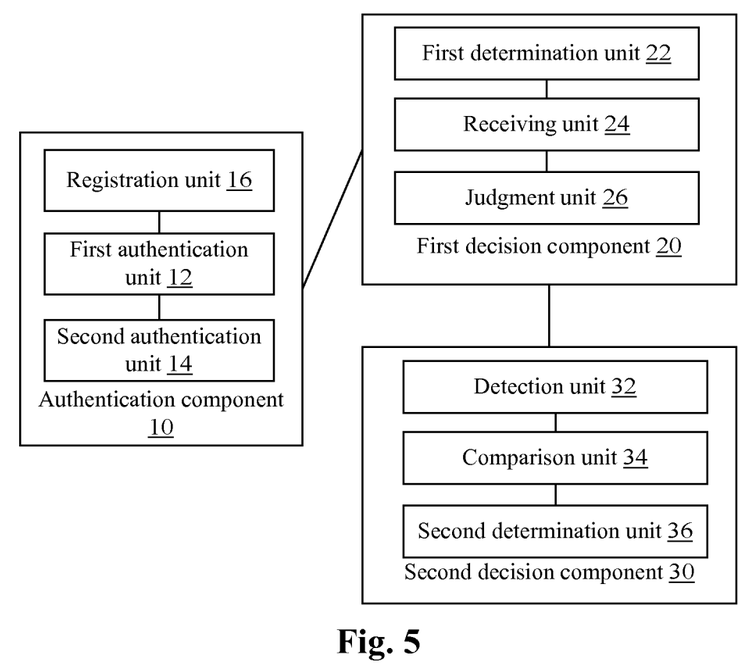
FIG. 5 is a structure diagram of a single-card multi-mode multi-operator authentication device according to another example embodiment of the disclosure.

FIG. 5 is a structure diagram of a single-card multi-mode multi-operator authentication device according to another example embodiment of the disclosure. As shown in FIG. 5, the first decision component 20 in the device can include: a first determination unit 22, configured to determine that the authentication on each network in the hybrid networks is passed; a receiving unit 24, connected to the first determination unit 22 and configured to receive the terminal position information about the UE, which is detected by the UE via a GPS component and indicates a country or an area where the UE is currently located; and a judgment unit 26, connected to the receiving unit 24 and configured to judge whether the terminal position information is the same as the operator area information, wherein the operator area information is included in the operator information.

In the present embodiment, the second decision component 30 in the device can include: a detection unit 32, configured to perform signal detection on each network via a radio frequency signal to acquire the signal strength of each network, and combine the signal strength of all the networks into a vector combination according to the network mode information, and issue the vector combination via a radio interface layer (RIL) and a communication processor (CP); a comparison unit 34, connected to the detection unit 32 and configured to receive the vector combination and parse out signal strength corresponding to the operator base station from the vector combination, and compare the signal strength parsed out with a signal strength range covered by the operator base station, if the signal strength parsed out falls within the signal strength range, return information about correct authentication to a second determination unit via the RIL and the CP, and otherwise, return information about incorrect authentication; and a second determination unit 36, connected to the comparison unit 34 and configured to, when receiving the information about correct authentication, determine that all the networks in the hybrid networks are authenticated successfully, or, when receiving the information about incorrect authentication, determine that the authentication fails.

It should be noted that the hybrid networks, which can be authenticated by using the single-card multi-mode multi-operator authentication device as shown in the above-mentioned FIG. 3, FIG. 4 and FIG. 5, may include at least two of the following: an enhanced data rate for GSM evolution (EDGE) network, a time-division multiplexing (TD) network, a wireless fidelity (WIFI) network, and a long term evolution (LTE) network. Certainly, in practical applications, more than two networks in the above-mentioned four networks can be randomly combined as required.

Certainly, in practical applications, all the devices capable of achieving the above-mentioned single-card multi-mode multi-operator authentication method can be used, and substantially, different device implementation forms still have the same or similar function.

For example, the following device implementation provided by the embodiment can be adopted.

The embodiment is mainly developed and designed on the basis of Android platform architecture, and the entire system architecture of the device mainly includes several main components such as Framework, RIL and CP, especially including an MAML management component located between the Framework and the RIL. Each component in the present embodiment, especially the MAML management component, is described in detail below with reference to FIGS. 6 and 7.

Figure 6:
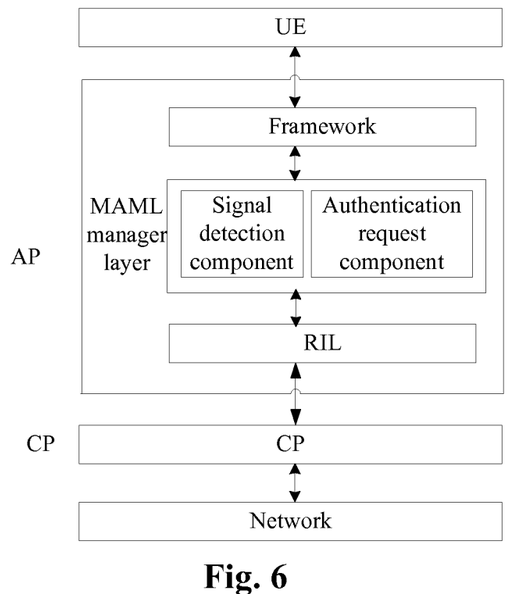
FIG. 6 is a structure diagram of a single-card multi-mode multi-operator authentication device according to a further example embodiment of the disclosure.

FIG. 6 is a structure diagram of a single-card multi-mode multi-operator authentication device according to a further example embodiment of the disclosure. As shown in FIG. 6, it mainly includes: an application processor (AP) and a communication processor (CP). The AP mainly includes a framework layer, a radio interface layer (RIL) and the most important multi-mode authentication manager layer (MAML). Furthermore, the MAML management component mainly includes a signal detection component and an authentication request component. Each functional component is described below.

The Framework component is mainly responsible for receiving, sending and processing a request message issued by a user operation application program and a message returned by the MAML manager layer. The user firstly requests for an authentication application, selects to apply for what kind of network and determines whether to apply for a multi-mode authentication way on the application program. After the Framework component receives the request message, the Framework component sends the request message to the MAML manager layer so that the MAML manager layer further processes and interacts with the RIL layer. After a network side receives the request message, it waits for the final reporting of feedback information.

Figure 7:
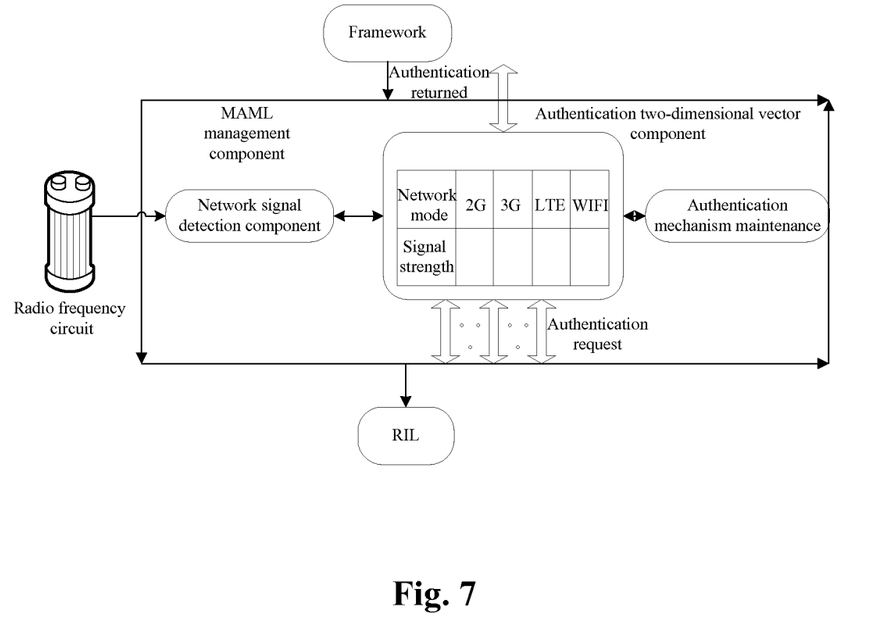
FIG. 7 is an internal architecture diagram of an MAML management component in the single-card multi-mode multi-operator authentication device shown according to FIG. 6.

The MAML management component is a core component of the embodiment (please refer to FIG. 7 simultaneously, and FIG. 7 is an internal architecture diagram of an MAML management component in the single-card multi-mode multi-operator authentication device shown according to FIG. 6), and the main function thereof is to firstly process an authentication request message of a default network that is issued by the Framework component in the start-up process. The default network is decided based on the registered network when the SIM card finds a network after the start-up. Next, the Framework component receives the authentication request of the user application program and the MAML manager layer processes the authentication request message. The processing mainly includes the following steps: (1) firstly, authenticating the registered network by using the authentication solution of this network, waiting for the return of a correct authentication message from a network side, and if an incorrect authentication message is returned, immediately stopping the subsequent authentication steps; (2) authenticating other 2G and 3G networks step by step using their respective authentication solutions, and waiting for the return of correct authentication information from the network side; (3) starting a GPS component to detect the position of the current country and area, confirming that the registered operator area is consistent with the area position detected by the GPS, and returning the result to the Framework layer via the MAML manager layer to notify the Framework layer of the result; and (4) the MAML manager layer further integrating a network detection mechanism, detecting the signals of the current 2G/3G/4G/Wifi hybrid networks in real time and ordering these networks according to signal strength, taking a network mode and the signal strength as an authentication two-dimensional vector combination and sending the same to the network side via the MAML layer in an FIFO manner, since each operator can acquire the signal strength of the area covered by a 3G/LTE base station, parsing and comparing the signal strength with the authentication vector combination of the signal strength of the network side to confirm whether the signal strength ranges are consistent, and after the result is returned to a network CP side, notifying the authentication result via the MAML layer. The internal structure of the MAML layer management component is as shown in FIG. 2. The CP mainly achieves the 3GPP protocol support required by a 3G terminal during data transmission and directly interacts with an air interface network.

In the process of using the device, a terminal starts up and requests to authenticate a default registered network. When the terminal moves to a WIFI or LTE coverage area, the terminal may optimally select to authenticate the WIFI and LTE networks (a user terminal SIM card may burn authentication information about multiple operators firstly); the terminal waits for a return value for the authentication from the MAML manager layer and compares the return value with the authentication information on the SIM card itself to judge an authentication result; next, authentication comparison is performed on other networks level by level. The above stage is a single network authentication method. The solution provided by the present embodiment not only puts forward an authentication method in a polling manner under a single network, but also further ensures the security of the SIM card of a user terminal by using a two-dimensional authentication vector combination according to different signal strength under 2G/3G/4G/Wifi hybrid and complex networks.

By means of the single-card multi-mode multi-operator authentication device provided by the above-mentioned embodiment, multi-level authentication and relevant information judgment with regard to each network in hybrid networks are performed so as to finally determine whether the authentication on all the hybrid networks is successful. Whenever the authentication on one network is not passed, a network side will return error information to an MAML, and the MAML parses out which kind of network mode has an error and finally notifies a terminal user, thereby achieving the effect of ensuring the security when a valid user uses a SIM card so that the valid user can acquire secure network services, and ensuring well network operation for an operator.

It can be seen from the above-mentioned description that the disclosure achieves the following technical effects: multi-level authentication and relevant information judgment with regard to each network in hybrid networks are performed so as to finally determine whether the authentication on all the hybrid networks is successful achieves an authentication mechanism of hybrid networks under the conditions of the coexistence of multiple networks and the coexistence of multiple operators; whenever the authentication on one network is not passed, a network side will return error information to an MAML, and the MAML parses out which kind of network mode has an error and finally notifies a terminal user, achieving full and reliable transmission of user information as well as secret communication, and thereby achieving the effect of ensuring the security when a valid user uses a SIM card so that the valid user can acquire secure network services, and ensuring well network operation for an operator.

Obviously, those skilled in the art should know that each of the mentioned components or steps of the disclosure can be realized by universal computing devices; the components or steps can be focused on single computing device, or distributed on the network formed by multiple computing devices; selectively, they can be realized by the program codes which can be executed by the computing device; thereby, the components or steps can be stored in the storage device and executed by the computing device; and under some circumstances, the shown or described steps can be executed in different orders, or can be independently manufactured as each integrated circuit component, or multiple components or steps thereof can be manufactured to be single integrated circuit component, thus to be realized. In this way, the disclosure is not restricted to any particular hardware and software combination.

The descriptions above are only the preferable embodiment of the disclosure, which are not used to restrict the disclosure, for those skilled in the art, the disclosure may have various changes and variations. Any modification, equivalent replacement, or improvement made within the principle of the disclosure shall all fall within the protection scope as defined by the appended claims of the disclosure.

What is claimed is:

1. A single-card multi-mode multi-operator authentication method, comprising:
   a multi-mode authentication manager layer (MAML) in an application processor (AP) receiving an authentication request from a user via a framework layer, and authenticating hybrid networks found by a user equipment (UE);
   under a condition that the MAML determines that the authentication on each network in the hybrid networks is passed, receiving terminal position information sent by the UE, and judging whether the terminal position information is the same as operator area information registered by the UE in advance; and
   under a condition that the terminal position information is the same as the operator area information, the MAML acquiring signal strength of each of the networks and judging whether the signal strength of each of the networks falls within a signal strength range covered by a base station under the network, if a judgment result is yes, determining that all networks in the hybrid networks are authenticated successfully, and if the judgment result is no, determining that the authentication fails.

2. The method according to claim 1, wherein the MAML in the AP receiving the authentication request from the user via the framework layer, and authenticating the hybrid networks found by the UE comprises:
the MAML receiving the authentication request sent by the user regarding a default network via the framework layer, and authenticating the default network, wherein the default network is any network in the hybrid networks; and
under a condition that the authentication on the default network is passed, authenticating other networks apart from the default network in the hybrid networks.

3. The method according to claim 2, wherein before the MAML receives the authentication request sent by the user regarding the default network via the framework layer, the method further comprises:
the UE inserted with a subscriber identity module (SIM) card acquiring signal strength of all the networks in the hybrid networks, and registering the network with the strongest signal strength as the default network, wherein the SIM card is burned with various network mode information and multiple operator information.

4. The method according to claim 3, wherein the MAML receiving the authentication request sent by the user regarding the default network via the framework layer, and authenticating the default network comprises:
the MAML receiving a first authentication request sent by the user regarding the default network via the framework layer, and sending the first authentication request to a first operator platform of the default network via a radio interface layer (RIL) and a communication processor (CP); and
receiving, via the RIL and the CP, a first authentication result fed back by the first operator platform, and determining whether the authentication on the default network is passed according to the first authentication result.

5. The method according to claim 3, wherein under the condition that the authentication on the default network is passed, authenticating other networks apart from the default network in the hybrid networks comprises:
the MAML receiving a second authentication request sent by the user regarding other networks apart from the default network in the hybrid networks via the framework layer, and sending the second authentication request to a second operator platform of the other networks via the RIL and the CP; and
receiving, via the RIL and the CP, a second authentication result fed back by the second operator platform, and determining whether the authentication on the other networks is passed according to the second authentication result.

6. The method according to claim 3, wherein under the condition that the MAML determines that the authentication on each network in the hybrid networks is passed, receiving the terminal position information sent by the UE, and judging whether the terminal position information is the same as the operator area information registered by the UE in advance comprise:
determining that the authentication on each network in the hybrid networks is passed;
receiving the terminal position information about the UE, which is detected by the UE via a GPS component and indicates a country or an area where the UE is currently located; and
judging whether the terminal position information is the same as the operator area information, wherein the operator area information is included in the operator information.

7. The method according to claim 3, wherein under the condition that the terminal position information is the same as the operator area information, the MAML acquiring the signal strength of each of the networks and judging whether the signal strength of each of the networks falls within a signal strength range covered by a base station under the network, if the judgment result is yes, determining that all the networks in the hybrid networks are authenticated successfully, and if the judgment result is no, determining that the authentication fails comprise:
the MAML performing signal detection on each network via a radio frequency signal to acquire the signal strength of each network, and combining the signal strength of all the networks into a vector combination according to the network mode information, and issuing the vector combination to each operator base station via the RIL and the CP;
the operator base station parsing out signal strength corresponding to the operator base station from the vector combination, and comparing the signal strength parsed out with a signal strength range covered by the operator base station, if the signal strength parsed out falls within the signal strength range, returning information about correct authentication to the MAML via the RIL and the CP, and otherwise, returning information about incorrect authentication; and
when the MAML receives the information about correct authentication, determining that all the networks in the hybrid networks are authenticated successfully, and when the MAML receives the information about incorrect authentication, determining that the authentication fails.

8. The method according to claim 1, wherein
after determining that all the networks in the hybrid networks are authenticated successfully, the MAML notifies the user that the hybrid networks are secure via the framework layer, or,
after determining that the authentication fails, the MAML notifies the user that the hybrid networks have a security risk via the framework layer.

9. The method according to claim 8, wherein under the condition that the MAML determines that the authentication on one or more networks in the hybrid networks is not passed, it is determined that the authentication on the hybrid networks fails.

10. The method according to claim 9, wherein under the condition that the terminal position information is not the same as the operator area information, it is determined that the authentication on the hybrid networks fails.

11. The method according to claim 10, wherein the hybrid networks comprise at least two of the following:
an enhanced data rate for GSM evolution (EDGE) network, a time-division multiplexing (TD) network, a wireless fidelity (WIFI) network, and a long term evolution (LTE) network.

12. A single-card multi-mode multi-operator authentication device, comprising:

an authentication component, configured to receive an authentication request from a user via a framework layer, and authenticate hybrid networks found by a user equipment (UE);

a first decision component, configured to, under a condition of determining that the authentication on each network in the hybrid networks is passed, receive terminal position information sent by the UE, and judge whether the terminal position information is the same as operator area information registered by the UE in advance; and a second decision component, configured to, under a condition that the terminal position information is the same as the operator area information, acquire signal strength of each of the networks and judge whether the signal strength of each of the networks falls within a signal strength range covered by a base station under the network, if a judgment result is yes, determine that all networks in the hybrid networks are authenticated successfully, and if the judgment result is no, determine that the authentication fails.

13. The device according to claim 12, wherein the authentication component comprises:
a first authentication unit, configured to receive an authentication request sent by a user regarding a default network via the framework layer, and authenticate the default network, wherein the default network is any network in the hybrid networks; and
a second authentication unit, configured to, under a condition that the authentication on the default network is passed, authenticate other networks apart from the default network in the hybrid networks.

14. The device according to claim 13, wherein the authentication component further comprises:
a registration unit, configured to, according to a subscriber identity module (SIM) card, acquire signal strength of all the networks in the hybrid networks, and register the network with the strongest signal strength as the default network, wherein the SIM card is burned with various network mode information and multiple operator information.

15. The device according to claim 14, wherein the first decision component comprises:
a first determination unit, configured to determine that the authentication on each network in the hybrid networks is passed;
a receiving unit, configured to receive the terminal position information about the UE, which is detected by the UE via a GPS component and indicates a country or an area where the UE is currently located; and
a judgment unit, configured to judge whether the terminal position information is the same as the operator area information, wherein the operator area information is included in the operator information.

16. The device according to claim 14, wherein the second decision component comprises:
a detection unit, configured to perform signal detection on each network via a radio frequency signal to acquire the signal strength of each network, and combine the signal strength of all the networks into a vector combination according to the network mode information, and issue the vector combination via a radio interface layer (RIL) and a communication processor (CP);
a comparison unit, configured to receive the vector combination and parse out signal strength corresponding to the operator base station from the vector combination, and compare the signal strength parsed out with a signal strength range covered by the operator base station, if the signal strength parsed out falls within the signal strength range, return information about correct authentication to a second determination unit via the RIL and the CP, and otherwise, return information about incorrect authentication; and
the second determination unit, configured to, when receiving the information about correct authentication, determine that all the networks in the hybrid networks are authenticated successfully, or, when receiving the information about incorrect authentication, determine that the authentication fails.

17. The device according to claim 16, wherein the hybrid networks comprise at least two of the following:
an enhanced data rate for GSM evolution (EDGE) network, a time-division multiplexing (TD) network, a wireless fidelity (WIFI) network, and a long term evolution (LTE) network.

18. The method according to claim 6, wherein
after determining that all the networks in the hybrid networks are authenticated successfully, the MAML notifies the user that the hybrid networks are secure via the framework layer, or,
after determining that the authentication fails, the MAML notifies the user that the hybrid networks have a security risk via the framework layer.

19. The method according to claim 7, wherein
after determining that all the networks in the hybrid networks are authenticated successfully, the MAML notifies the user that the hybrid networks are secure via the framework layer, or,
after determining that the authentication fails, the MAML notifies the user that the hybrid networks have a security risk via the framework layer.

20. The device according to claim 15, wherein the second decision component comprises:
a detection unit, configured to perform signal detection on each network via a radio frequency signal to acquire the signal strength of each network, and combine the signal strength of all the networks into a vector combination according to the network mode information, and issue the vector combination via a radio interface layer (RIL) and a communication processor (CP);
a comparison unit, configured to receive the vector combination and parse out signal strength corresponding to the operator base station from the vector combination, and compare the signal strength parsed out with a signal strength range covered by the operator base station, if the signal strength parsed out falls within the signal strength range, return information about correct authentication to a second determination unit via the RIL and the CP, and otherwise, return information about incorrect authentication; and
the second determination unit, configured to, when receiving the information about correct authentication, determine that all the networks in the hybrid networks are authenticated successfully, or, when receiving the information about incorrect authentication, determine that the authentication fails.

* * * * *